Nov. 20, 1928.
B. A. CRENSHAW
1,692,333
SIGNALING DEVICE
Filed May 16, 1927
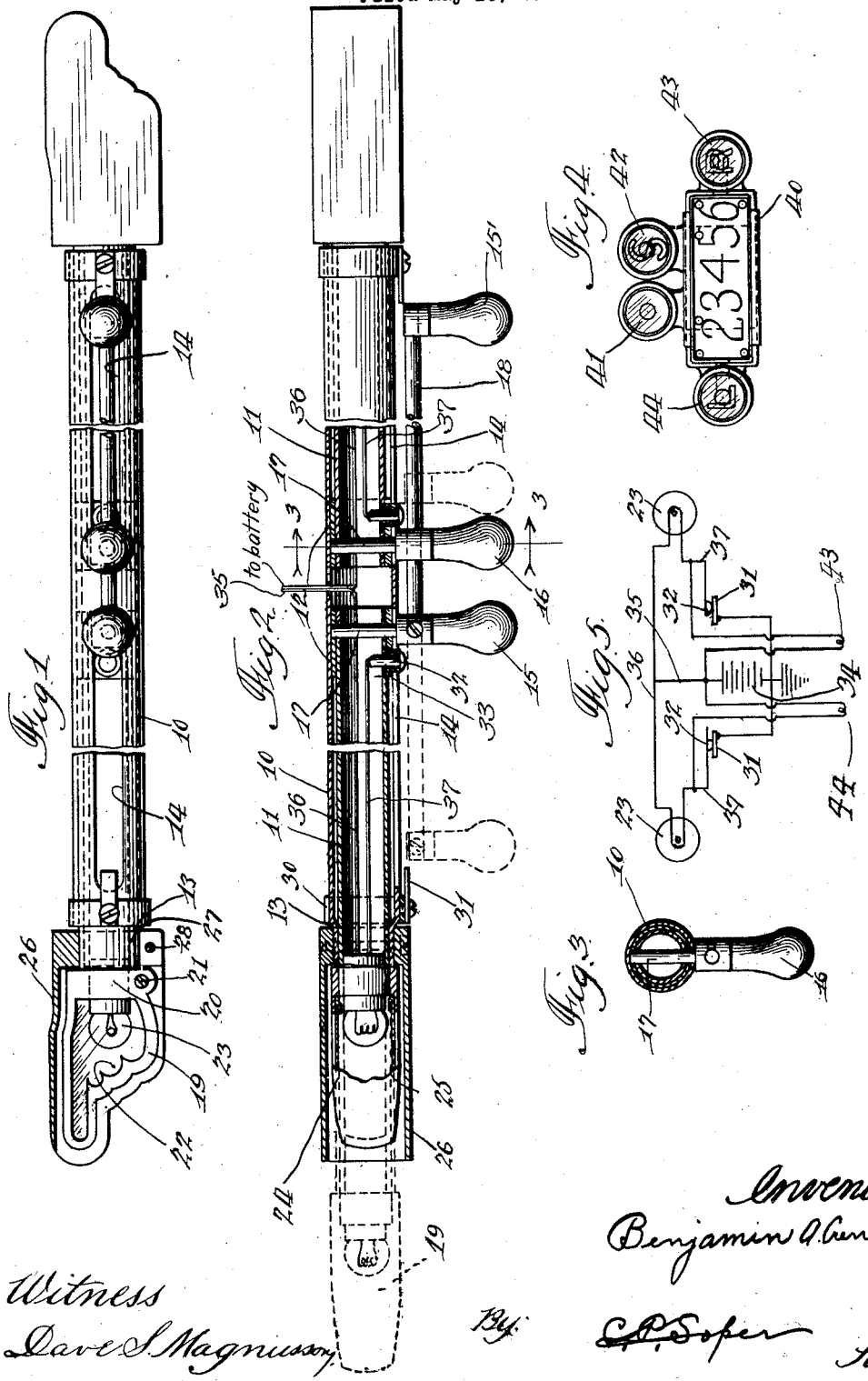

Patented Nov. 20, 1928.

1,692,333

UNITED STATES PATENT OFFICE.

BENJAMIN A. CRENSHAW, OF CHICAGO, ILLINOIS.

SIGNALING DEVICE.

Application filed May 16, 1927. Serial No. 191,631.

This invention relates to signaling devices of character commonly used on motor vehicles to indicate to observers, either in adjacent vehicles or pedestrians, the intended operation or movement of the vehicle on which the signal is mounted. The present invention comprises a plurality of signals and lights so arranged that they may be readily observed from either in front of the car or at the rear both in the day or at night.

An object of the invention is to provide a signaling device which is capable of observation from both front and rear of the car in the day as well as at night and which may be controlled by means or mechanism so positioned as to be easily actuated by the driver of the car.

One of the features of the invention is the provision of a signaling device in the form of a hand with the index finger extended and a signal light within the cut away central portion of the hand which operates to illuminate the hand at night to render it plainly visible. Colored glass or lenses may be provided on opposite sides of the light and overlying the cut away portion so that the signaling hand appears red when viewed from the rear and preferably green when seen from the front. In practice a pair of such signaling hands usually will be provided, one adapted to be projected from the right side of the car, preferably adjacent to the wind shield and one from the left side where the car is about to be guided to the right or left, respectively. Operating in conjunction with the signaling means just above described is a pair of lights at the rear of the car adapted to be illuminated, when the corresponding hand is illuminated to provide an additional signal which may be seen from any point at the rear.

Another feature of the invention is unique means provided to prevent the simultaneous display of both sets of signals.

Other features and advantages will appear from time to time as the description of the invention progresses.

It is believed the further explanation of the invention will be understood most readily from a detailed description thereof taken in connection with the accompanying drawings in which Fig. 1 is a view of the signaling device as viewed from the rear of the car, a portion being in section to better illustrate the structure;

Fig. 2 is a plan view of the device with part cut away and shows in dotted lines at the left the position of the parts when the left hand signaling device is extended;

Fig. 3 is a section substantially on the line 3—3 of Fig. 2;

Fig. 4 is a view of the rear light cluster as seen from behind the car, and

Fig. 5 is a circuit diagram showing schematically the electrical connection for illuminating the signal lights.

Referring now to the drawings, in which like reference characters indicate like parts in the several views, 10 indicates a tubular housing preferably of sheet metal adapted to be secured to the instrument board of an automobile by any desired means. This housing will occupy a horizontal position, usually adjacent to the upper edge of the instrument board, although on cars of certain construction it may be secured below the upper margin or even to the lower part of the wind shield in some cases. The only requisite is that it be mounted in a substantially horizontal position in such a manner that the operating handles are within easy reach of the operator of the car. When the device shown in Fig. 1 is mounted on the car, the ends will preferably terminate respectively adjacent to the outer edges of the wind shield.

Slidably mounted within the housing 10 is a pair of signal carrying arms 11. Surrounding the adjacent ends of the tubular arms 11 are the spacing sleeves or collars 12. The housing 10 has its outer ends 13 reduced in diameter to form a sliding fit about the arms 11. The housing 10 is provided on the face thereof with aligned slots 14 within which slide the bases of handles 15 and 16 secured to the sliding arms 11 by means of bolts or rivets 17. A rod 18 extends through a suitable opening in the base of handle 16 and has its end secured within the base of handle 15. A handle 15' is carried at the outer end of rod 18.

Secured to the outer end of each of the signal arms 11 in any desired manner is a signaling hand 19. In the present disclosure the base or wrist portion of the hand is formed as a split sleeve or collar so adapted to be clamped about the end of arm 11 by means of screw 21. As the signaling devices at the opposite ends of the apparatus are identical only one will be described in detail. The hand 19 has the central portion cut away in the form of a hand with the index finger extended as shown at 22. Carried at the end of each arm 11 is a lamp socket, not shown in detail, within which is mounted an incandescent light bulb 23. The outline portion of the hand 19, 22 is of thickness sufficient to receive the bulb 23 and colored glass or lenses are provided to overlie the cut away portion 22 on opposite sides of lamp 23. The lens 24, visible from in front of the car, will preferably be green while lens 25, seen from the rear of the car, will be red.

Secured to the outer reduced end 13 of housing 10 is a housing member 26 adapted to cover or shield the hand 19 when in its normal position. The housing 26 is formed with a split sleeve which is secured about the portion 13 by means of screw 28. Thus it will be seen that, when in normal position, the hand 19 and parts associated therewith are protected by the housing 26 but when the signal is extended, as shown by dotted lines in Fig. 2, it is clearly visible from both the front and rear.

Secured in electrical contact with housing 10, by means of sleeve 30, is a spring contact 31 arranged to be engaged by a contact stud 32 insulatively mounted on arm 11 by means of the collar 33 of fiber or other suitable material, when the signal is moved to its outermost operative position.

One contact of each of the lamps 23 is connected to the live pole of the battery 34 (see Fig. 5) by means of conductors 35 and 36. The other contact of each lamp 23 is joined to stud 32 by means of conductor 37. As the contact spring 31 is joined to the grounded pole of the battery through the frame of the machine, a circuit is closed for one or the other of the lamps 23 whenever a contact stud 32 engages a spring 31.

In the drawings the device is shown assembled for use on right hand side drive cars such as are common in Europe, as indicated by the operating handles being at the right. The rod 18 and handle 15' not only form a link between handles 15 and 15' but also provides a handle which is at all times within convenient reach of the driver to operate the left signal. It will be noted also that this link connection operates to prevent the simultaneous display of both signals. If one signal is displayed and the other is extended without withdrawing the first one, the link 18 acts to automatically withdraw the previously extended arm.

In Fig. 4 is shown a license plate carrier 40 on which is mounted the tail light 41, the stop light 42 and the direction signal lamps 43 and 44. Referring now to Fig. 5 it will be noted that the lamps 43 and 44 are connected in parallel with the right and left lamps 23, respectively, so that, whenever a signal 23 is actuated the corresponding rear direction signal 43 or 44 is illuminated, thus providing an additional signal at the rear which should be visible in case the forward direction signal is hidden by the top of the car.

It is obvious that the device herein disclosed may be applied to a left hand drive car as the split sleeve connections between the hands 19, the housings 26 and the supporting parts permit the necessary adjustments of the parts to be made readily.

While in the drawing and in the above description but a single form of the device is disclosed, it is to be understood that certain modifications are contemplated and the invention, therefore, should be limited only by the scope of the appended claims.

Having thus described the invention, what I claim is new and desire to secure by Letters Patent of the United States is:

1. In a direction signal for vehicles, a pair of independent oppositely laterally movable members, a signal at the outer end of each of said members, means for selectively moving said members to display the desired signal and means interconnecting the members, so that on projection of one the other will be automatically retracted.

2. In a direction indicator for vehicles, a pair of independently, movable signal arms, electric light bulbs, one at the outer end of each of said arms, means for selectively operating said arms to project one or the other, circuits for said bulbs respectively, means for closing the circuit of a bulb when the corresponding arm is operated and means interconnecting said arms so that on projection of one the other will be automatically retracted and the circuit opened to its respective bulb.

3. In a direction indicator for vehicles, a tubular member arranged transversely of the vehicle, a pair of signal arms independently movable longitudinally of said tubular member in opposite directions, a signal at the outer end of each of said arms, operating handles one associated with each of said arms for projecting or withdrawing said arms and means interconnecting said handles for the automatic retraction of one signal on the projection of the other.

4. In a direction indicator for vehicles, a tubular body member arranged transversely of the vehicle, independently movable signal arms within said tubular member and slidable therein in opposite directions to project beyond the side of the vehicle, an electric light bulb carried at the outer end of each of said arms, electrical circuits for said bulbs respectively, means for selectively extending and withdrawing either of said arms, means associated with said arms for closing the corresponding circuit when an arm is operated and means interconnecting said arms so that on projection of one arm its bulb will be illuminated and the other arm will be automatically retracted and its bulb extinguished.

5. In a direction signal for vehicles, a tubular body member arranged transversely of the vehicle, independently movable signal arms slidable within said tubular member in opposite directions to project beyond the side of the vehicle, handles for said arms respectively projecting through slots in said tubular member whereby said arms may be selectively projected, signals one at the outer end of each of said arms and means interconnecting said handles so that on projection of one arm the other will be automatically retracted.

6. In a direction signal for motor vehicles, a body member arranged to be attached transversely to a motor vehicle adjacent to the instrument board, laterally extensible signal arms slidably mounted on said body member, a signal at the outer end of each of said arms, and means interconnecting the arms, so that on the projection of one the other will be automatically retracted, each said signal comprising a member formed to represent a hand with the index finger extended, the central portion of said member being cut away to provide a similar hand shaped open space, an incandescent light bulb within said space and lenses of colored translucent material overlying said space on opposite sides of said bulb.

7. In a direction signal for motor vehicles, a body member arranged to be attached transversely to a motor vehicle adjacent to the instrument board, laterally extensible signal arms slidably mounted on said body member, a signal at the outer end of each of said arms, and means interconnecting the arms, so that on the projection of one the other will be automatically retracted, each said signal comprising a member formed to represent a hand with the index finger extended, the central portion of said member being cut away to provide a similar hand shaped open space, an incandescent light bulb within said space and lenses of colored translucent material overlying said space on opposite sides of said bulb, the said lenses being of contrasting colors.

8. In a direction signal for motor vehicles, a body member arranged to be attached transversely to a motor vehicle adjacent to the instrument board, laterally extensible signal arms slidably mounted on said body member, a signal at the outer end of each of said arms, and means interconnecting the arms, so that on the projection of one the other will be automatically retracted, each said signal comprising a member formed to represent a hand with the index finger extended, the central portion of said member being cut away to provide a similar hand shaped open space, an incandescent light bulb within said space, lenses of colored translucent material overlying said space on opposite sides of said bulb, an electric circuit for said light bulb and means for closing said circuit incident to extending its signal arm.

9. In a direction signal for vehicles, a tubular member, a pair of independent oppositely laterally movable members in said tubular member, a signal at the outer end of each of said members, means for selectively moving said members to extend the desired signal, means for interconnecting the signals, so that on the projection of one the other will be automatically retracted, an electric light bulb in each of said movable members, circuits for said bulbs, respectively, each of said circuits including a stationary contact carried by said tubular member, and a movable contact carried by its respective movable member, means for adjusting the position of said contacts on said tubular member, and stops, one on each movable member cooperating with its said stationary contact member for limiting the outward movement of the corresponding movable member.

10. In a direction signal, housings adapted to be located exteriorly and at opposite sides of a vehicle, illuminating signal elements normally concealed within the housings and adapted to be projected therefrom, means for selectively projecting said signaling elements, and interconnections between the selective means so that on projection of one the other will be automatically retracted.

In testimony whereof I have signed this specification.

BENJAMIN A. CRENSHAW.